United States Patent
Rahimi et al.

(10) Patent No.: US 11,288,498 B2
(45) Date of Patent: Mar. 29, 2022

(54) LEARNING ACTIONS WITH FEW LABELS IN THE EMBEDDED SPACE

(71) Applicant: HRL Laboratories, LLC, Malibu, CA (US)

(72) Inventors: Amir M. Rahimi, Santa Monica, CA (US); Hyukseong Kwon, Thousand Oaks, CA (US); Heiko Hoffmann, Simi Valley, CA (US); Soheil Kolouri, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/931,420

(22) Filed: Jul. 16, 2020

(65) Prior Publication Data

US 2021/0089762 A1 Mar. 25, 2021

Related U.S. Application Data

(60) Provisional application No. 62/902,799, filed on Sep. 19, 2019.

(51) Int. Cl.
*G06K 9/00* (2006.01)
*G06K 9/62* (2006.01)
*G06T 7/70* (2017.01)

(52) U.S. Cl.
CPC ....... *G06K 9/00362* (2013.01); *G06K 9/6223* (2013.01); *G06K 9/6255* (2013.01);
(Continued)

(58) Field of Classification Search
None
See application file for complete search history.

(56) References Cited

U.S. PATENT DOCUMENTS 10,913,454 B2 * 2/2021 Pindeus ............... G06F 16/29
11,017,250 B2 * 5/2021 Turcot ................. G06K 9/6259
(Continued)

FOREIGN PATENT DOCUMENTS

CN 102214309 B * 12/2012
CN 111670468 A * 9/2020 ......... G06K 9/00805
(Continued)

OTHER PUBLICATIONS

Lillo et al., A Hierarchical Pose-Based Approach to Complex Action Understanding Using Dictionaries of Actionlets and Motion Poselets, IEEE Conference on Computer Vision and Pattern Recognition (CVPR), (Year: 2016).*

(Continued)

*Primary Examiner* — Mohammed Rachedine
(74) *Attorney, Agent, or Firm* — Tope-McKay & Associates

(57) ABSTRACT

Described is a system for learning actions for image-based action recognition in an autonomous vehicle. The system separates a set of labeled action image data from a source domain into components. The components are mapped onto a set of action patterns, thereby creating a dictionary of action patterns. For each action in the set of labeled action data, a mapping is learned from the action pattern representing the action onto a class label for the action. The system then maps a set of new unlabeled target action image data onto a shared embedding feature space in which action patterns can be discriminated. For each target action in the set of new unlabeled target action image data, a class label for the target action is identified. Based on the identified class label, the autonomous vehicle is caused to perform a vehicle maneuver corresponding to the identified class label.

17 Claims, 13 Drawing Sheets

(52) U.S. Cl.
CPC .............. *G06K 9/6259* (2013.01); *G06T 7/70* (2017.01); *G06T 2207/30252* (2013.01)

(56) References Cited

U.S. PATENT DOCUMENTS

| 11,079,771 | B2 * | 8/2021 | Battles | G08G 1/163 |
|---|---|---|---|---|
| 2018/0307930 | A1 * | 10/2018 | Mittal | G06K 9/00798 |
| 2019/0294871 | A1 * | 9/2019 | Vaezi Joze | G06K 9/00369 |
| 2019/0371080 | A1 * | 12/2019 | Sminchisescu | G06K 9/6256 |
| 2020/0125093 | A1 * | 4/2020 | Sham | G06K 9/3241 |
| 2021/0073525 | A1 * | 3/2021 | Weinzaepfel | G06K 9/6269 |

FOREIGN PATENT DOCUMENTS

| CN | 112446244 A | * | 3/2021 | |
|---|---|---|---|---|
| WO | WO-2018218286 A1 | * | 12/2018 | A61B 5/0062 |

OTHER PUBLICATIONS

Sung, Jaeyong, et al. "Unstructured human activity detection from RGBD images." Robotics and Automation (ICRA), 2012 IEEE International Conference on. IEEE, 2012, pp. 842-849.

Shu, Liangcai, et al. "Kernel-based transductive learning with nearest neighbors." Advances in Data and Web Management. Springer, Berlin, Heidelberg, 2009, pp. 345-356.

Deutsch, Shay, et al. "Zero shot learning via multi-scale manifold regularization." The IEEE Conference on Computer Mision and Pattern Recognition (CVPR), 2017, pp. 5292-5299.

Ofli, Ferda, et al. "Sequence of the most informative joints (SMIJ): A new representation for human skeletal action recognition." Journal of Visual Communication and Image Representation 25.1, 2014, pp. 24-38.

Wang, Jiang, et al. "Mining actionlet ensemble for action recognition with depth cameras." Computer Vision and Pattern Recognition (CVPR), IEEE Conference on. IEEE, 2012, pp. 1290-1297.

Xian, Yongqin, Bernt Schiele, and Zeynep Akata. "Zero-shot learning-the good, the bad and the ugly." arXiv preprint arXiv: 1703.04394, 2017, pp. 1-10.

Evangelidis, Georgios, Gurkirt Singh, and Radu Horaud. "Skeletal quads: Human action recognition using joint quadruples." Pattern Recognition (ICPR), 2014 22nd International Conference on. IEEE, 2014, pp. 4513-4518.

Xia, Lu, Chia-Chih Chen, and Jake K. Aggarwal. "View invariant human action recognition using histograms of 3D joints." Computer vision and pattern recognition workshops (CVPRW), 2012 IEEE computer society conference on. IEEE, 2012, pp. 20-27.

Yang, Xiaodong, and YingLi Tian. "Effective 3d action recognition using eigenjoints." Journal of Visual Communication and Image Representation 25.1, 2014, pp. 2-11.

Noroozi, Mehdi, et al. "Boosting Self-Supervised Learning via Knowledge Transfer." arXiv preprint arXiv: 1805.00385, 2018, pp. 1-9.

Cao, Zhe, et al. "Realtime multi-person 2D pose estimation using part affinity fields." Proceedings of the IEEE Conference on Computer Vision and Pattern Recognition, 2017, pp. 1302-1310.

Kolouri et al. "Sliced-wasserstein autoencoder: An embarrassingly simple generative model." arXiv preprint arXiv: 1804 01947, 2018, pp. 1-25.

Notification of Transmittal and the International Search Report, and the Written Opinion of the International Searching Authority for PCT/US2020/042431; dated Oct. 9, 2020.

Lillo Ivan, et al: "A Hierarchical Pose-Based Approach to Complex Action Understanding Using Dictionaries of Actionlets and Motion Poselets", 2016 IEEE Conference on Computer Vision and Pattern Recognition (CVPR), IEEE, Jun. 27, 2016 (Jun. 27, 2016), pp. 1981-1990, XP033021376.

Zhu Guangming, et al.: "Human action recognition using key poses and atomic motions", 2015 IEEE International Conference on Robotics and Biomimetics (ROBIO), IEEE, Dec. 6, 2015 (Dec. 6, 2015), pp. 1209-1214, XP032873270.

* cited by examiner

| Action types | Sample frame | Action path sample |
|---|---|---|
| Dribble | | |
| Flic-flac | | |
| Jump | | |
| Pour | | |
| Ride horse | | |

FIG. 5A

| Action types | Sample frame | Action path sample |
|---|---|---|
| Shoot gun | 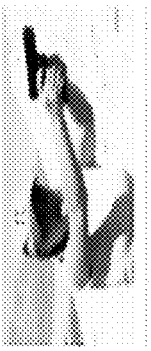 | 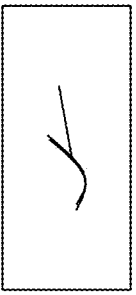 |
| Sit up |  |  |
| Stand |  | 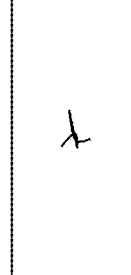 |
| Swing baseball |  | 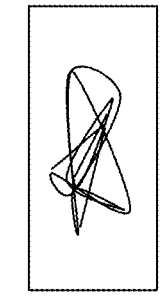 |
| Walk |  | 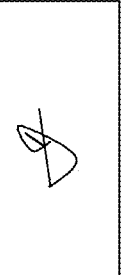 |
FIG. 5B

FIG. 6A

| Action types | Sample frame | Action path samples | | |
|---|---|---|---|---|
| Jumping | 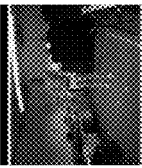 |  | 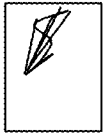 |  |
| Jumping jacks |  |  |  |  |
| Bending |  |  | 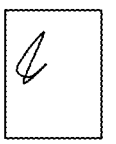 |  |
| Punching |  |  | 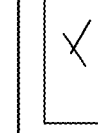 | 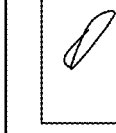 |
| Waving two hands |  |  |  | 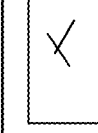 |
FIG. 6B

10 samples out of HMDB-51

| Action types | # of samples |
|---|---|
| Dribble | 138 |
| Flic flac | 75 |
| Jump | 67 |
| Pour | 102 |
| Ride horse | 114 |
| Shoot gun | 82 |
| Sit up | 102 |
| Stand | 109 |
| Swing baseball | 113 |
| Walk | 476 |

FIG. 7A

Berkeley MHAD

| Action types | # of samples |
|---|---|
| Jumping | 720 |
| Jumping Jacks | 716 |
| Bending | 720 |
| Punching | 720 |
| Waving two hands | 720 |
| Waving one hand | 720 |
| Clapping | 720 |
| Throwing | 584 |
| Sit down/stand up | 720 |
| Sit down | 576 |
| Stand up | 360 |

FIG. 7B

LEARNING ACTIONS WITH FEW LABELS IN THE EMBEDDED SPACE

CROSS-REFERENCE TO RELATED APPLICATIONS

The present application is a Non-Provisional application of U.S. Provisional Application No. 62/902,799, filed in the United States on Sep. 19, 2019, entitled, "Learning Actions with Few Labels in the Embedded Space," the entirety of which is incorporated herein by reference.

BACKGROUND OF INVENTION

(1) Field of Invention

The present invention relates to a system for image-based action recognition and, more particularly, to a system for image-based action recognition that enables action recognition to be trained with minimal samples.

(2) Description of Related Art

Prior work in the field of action recognition can be divided into two categories: image-based action recognition and skeletal joint-based action recognition. In image-based action recognition, the input features are computed from the visual appearance of the tracked person, whereas in skeletal joint-based techniques the input features are the joint constellation (either two-dimensional (2D) or three-dimensional (3D)) of joint locations (see Literature Reference Nos. 1, 4, and 7-9 of the List of Incorporated Literature References).

In Literature Reference No. 4, Ofli et al. define each action with a sequence of most informative joints, which captures the invariances in different human actions. At each instance, they prune down the total number of joints into a smaller, yet informative, subset based on the mean and variance of joint angle trajectories for each action. Given the angular velocity between the joints, they apply support vector machine (SVM) and k-nearest neighbor (KNN) to classify the actions. Literature Reference No. 7 defined an action descriptor that encodes the relative joint positions. After obtaining the view-invariant skeletal representation, they use fisher vector to encode the features and applied SVM classifier to classify the actions. In addition to joint positions, Sung et al. (see Literature Reference No. 1) described motion, hand position, and appearance features when applying a hierarchical Maximum Entropy Markov Model to representing actions. They perform inference on a two-layer graph using a dynamic programming approach.

Further, Yang et al. (see Literature Reference No. 9), came up with a new action descriptor based on the differences between joint positions within and across video frames to define an eigenjoints feature followed by a non-parametric Naive Bayes Nearest Neighbor classifier to discriminate between action. Wang et al. (see Literature Reference No. 5) combined the joint locations with the depth data and constructed an actionlet ensemble model to capture the relationship between body parts and the environment. They also tackled the noise and occlusion problem in action recognition. They introduced a feature based on Random Occupancy Pattern (ROP) and used sparse coding to robust encoding.

The state-of-the-art for learning fewer labeled samples is to use a deep neural network that is pre-trained on a different, but similar dataset, with lots of labeled samples and, then, re-tune the final layer(s) of the network to classify the new target dataset. This approach has two weaknesses. First, it assumes common features between datasets without enforcing commonality, leading to errors. Second, it neglects the abundance of unlabeled data, limiting its performance.

For learning without labels, state-of-the-art zero-shot learning (ZSL) approaches struggle with two things: 1) defining semantically meaningful atomic poses, which often come from human annotation or from paired textual domains; and 2) not knowing if the input samples belong to seen or unseen classes of data (i.e., generalized-ZSL versus classic ZSL), leading to a performance much lower than for supervised learning (i.e., 8× higher prediction error (see Literature Reference Nos. 3 and 6).

Thus, a continuing need exists for a system for image-based action recognition that requires few labels to increase the power and utility of machine learning for tasks where training data is very limited, while still maintaining recognition performance.

SUMMARY OF INVENTION

The present invention relates to a system for image-based action recognition, and more particularly, to a system for image-based action recognition that enables action recognition to be trained with minimal samples. The system one or more processors and a non-transitory computer-readable medium having executable instructions encoded thereon such that when executed, the one or more processors perform multiple operations. The system separates a set of labeled action image data from a source domain into components. The components are mapped onto a set of action patterns, thereby creating a dictionary of action patterns. For each action in the set of labeled action data, a mapping is learned from the action pattern representing the action onto a class label for the action. A set of new unlabeled target action image data is mapped onto a shared embedding feature space in which action patterns can be discriminated. For each target action in the set of new unlabeled target action image data, a class label for the target action is identified. Based on the identified class label, the autonomous vehicle is caused to perform a vehicle maneuver corresponding to the identified class label.

In another aspect, the shared embedding feature space is learned using self-supervised learning.

In another aspect, a data point from the set of new unlabeled target action image data is mapped onto a probability distribution of action patterns.

In another aspect, a skeletal pose map comprising a set of joint angles is computed from the set of new unlabeled target action image data; a feature representation of poses is generated based on the set of joint angles, resulting in a set of action pose features; and the set of action pose features is encoded to the shared embedding feature space with a uniform distribution.

In another aspect, a target action pattern representing the target action in the shared embedding feature space from the encoded set of action pose features is generated, and the target action pattern is classified.

In another aspect, the target action pattern is classified by a transductive K-Nearest Neighbor classifier.

In another aspect, the identified class label corresponds to a pedestrian's actions, and the vehicle maneuver is a maneuver around the pedestrian.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5A is an illustration of a first set of action types, sample frames, and the trajectory of each corresponding action in the embedding space according to some embodiments of the present disclosure;

FIG. 5B is an illustration of a second set of action types, sample frames, and the trajectory of each corresponding action in the embedding space according to some embodiments of the present disclosure;

FIG. 6A is an illustration of a first set of MHAD action paths in the embedding space according to some embodiments of the present disclosure;

FIG. 6B is an illustration of a second set of MHAD action paths in the embedding space according to some embodiments of the present disclosure;

FIG. 7A is a table illustrating distribution of datasets for ten samples out of Human Motion Database (HMDB-51) according to some embodiments of the present disclosure;

FIG. 7B is a table illustrating distribution of datasets for samples out of MHAD according to some embodiments of the present disclosure;

DETAILED DESCRIPTION

Figure 1:
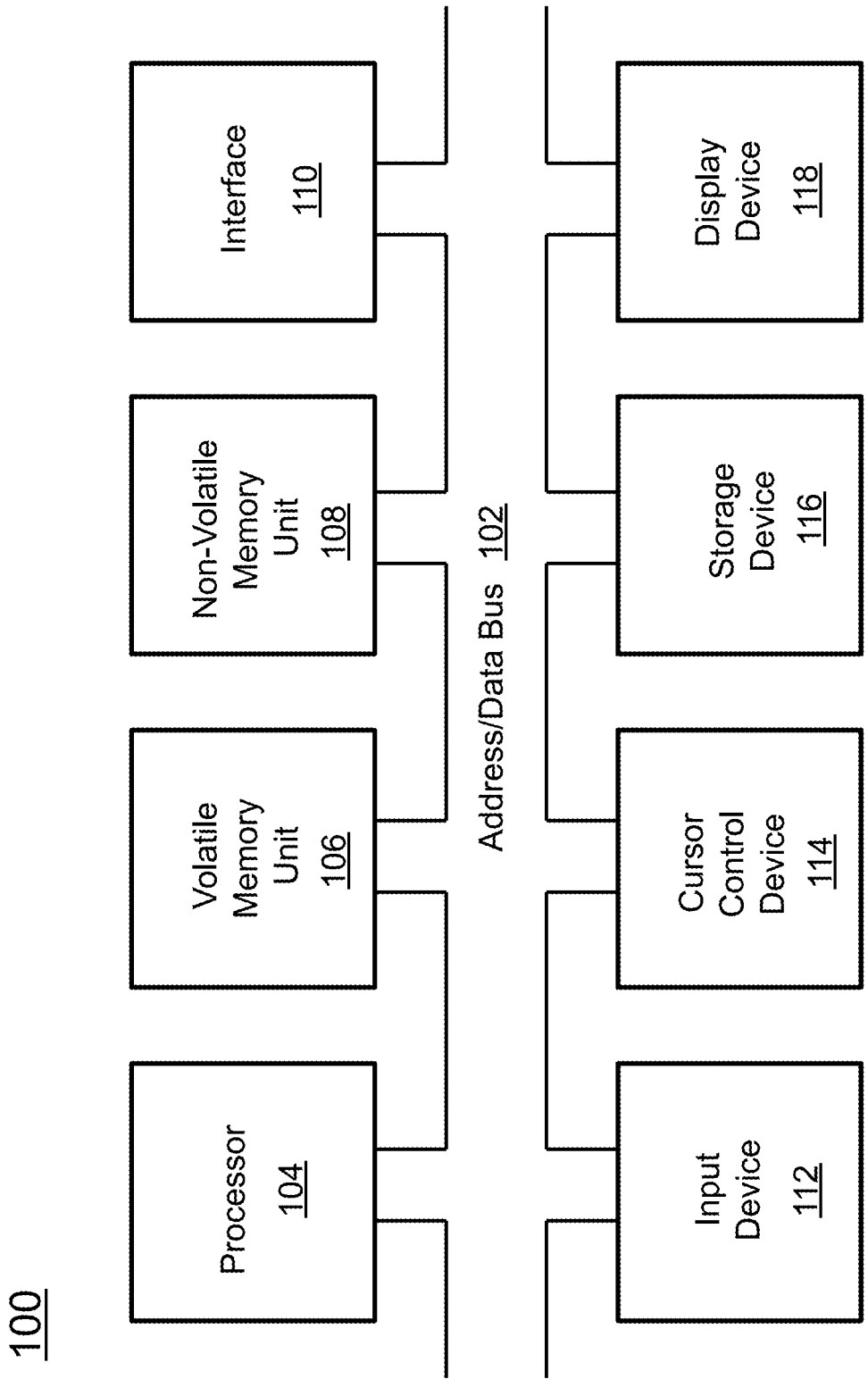
FIG. 1 is a block diagram depicting the components of a system image-based action recognition according to some embodiments of the present disclosure.

The present invention relates to a system for image-based action recognition, and more particularly, to a system for image-based action recognition that enables action recognition to be trained with minimal samples. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Sung, Jaeyong, et al. "Unstructured human activity detection from RGBD images." Robotics and Automation (ICRA), 2012 IEEE International Conference on. IEEE, 2012.
2. Shu, Liangcai, et al. "Kernel-based transductive learning with nearest neighbors." Advances in Data and Web Management. Springer, Berlin, Heidelberg, 2009. 345-356.
3. Deutsch, Shay, et al. "Zero shot learning via multi-scale manifold regularization." The IEEE Conference on Computer Vision and Pattern Recognition (CVPR), 2017.
4. Ofli, Ferda, et al. "Sequence of the most informative joints (SMIJ): A new representation for human skeletal action recognition." Journal of Visual Communication and image Representation 25.1, 2014. 24-38.

5. Wang, Jiang, et al. "Mining actionlet ensemble for action recognition with depth cameras." Computer Vision and Pattern Recognition (CVPR), IEEE Conference on. IEEE, 2012.
6. Xian, Yongqin, Bernt Schiele, and Zeynep Akata. "Zero-shot learning—the good, the bad and the ugly." arXiv preprint arXiv:1703.04394, 2017.
7. Evangelidis, Georgios, Gurkirt Singh, and Radu Horaud. "Skeletal quads: Human action recognition using joint quadruples." Pattern Recognition (ICPR), 2014 22nd International Conference on. IEEE, 2014.
8. Xia, Lu, Chia-Chih Chen, and Jake K. Aggarwal. "View invariant human action recognition using histograms of 3D joints." Computer vision and pattern recognition workshops (C 2012 IEEE computer society conference on. IEEE, 2012.
9. Yang, Xiaodong, and YingLi Tian. "Effective 3d action recognition using eigenjoints." Journal of Visual Communication and Image Representation 25.1, 2014. 2-11.
10. Noroozi, Mehdi, et al. "Boosting Self-Supervised Learning via Knowledge Transfer." arXiv preprint arXiv: 1805.00385, 2018.
11. Shu, Liangcai, et al. "Kernel-based transductive learning with nearest neighbors." Advances in Data and Web Management. Springer, Berlin, Heidelberg, 2009. 345-356.
12. Cao, Zhe, et al. "Realtime multi-person 2D pose estimation using part affinity fields." Proceedings of the IEEE Conference on Computer Vision and Pattern Recognition, 2017.
13. Kolouri et al. "Sliced-wasserstein autoencoder: An embarrassingly simple generative model." arXiv preprint arXiv: 1804.01947, 2018.

(2) Principal Aspects

Various embodiments of the invention include three "principal" aspects. The first is a system for image-based action recognition. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
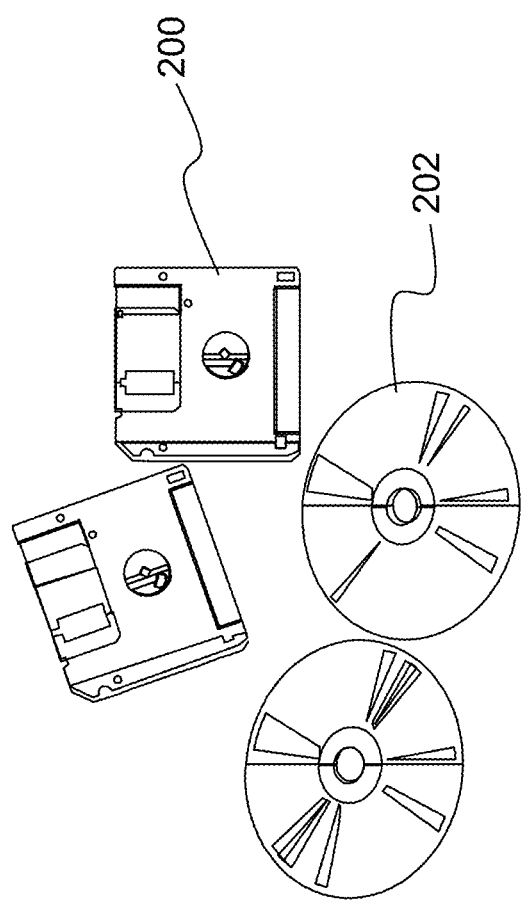
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Prior work in the field of action recognition can be divided into two categories: image-based action recognition and skeletal joint-based action recognition. In the invention described herein, the focus is on the latter category, where the location of joints are available (either through RGB-D (red, green, blue, depth) data or through some sort of joint estimation technique). The system according to embodiments of the present disclosure shows an improvement in the long short-term (LSTM) framework when skeletal joint-based features are mapped to an embedding space where actions are more separable.

In contrast to prior work, a mapping technique was formulated, where action pose features are mapped to an embedding space and where the redundant information is minimized and yet discriminative information between action patterns is intensified. A unique aspect of the present system is in the form of dimensionality reduction, where nonlinear action patterns are mapped to a linear space where simple linear classifiers can be applied. As a result, not only is performance gained compared to the prior art, but the model can be trained with much fewer samples.

Training a classifier with only a few labels per class can dramatically increase the power and utility of machine learning for many tasks. This is due to the fact that most state-of-the-art machine learning algorithms are data hungry during training. In the invention described herein, the focus is on the task of image-based action recognition where training data is very limited. Note that the term "limited" is a relative term and depending on how sophisticated the model is, the amount of training data should vary. In a desired embodiment, the goal is to train an accurate model with less than 10 samples. The invention includes a technique to learn new models with only a few labels per class and minimal performance degradation relative to supervised learning techniques. Furthermore, given that high dimensional action patterns (e.g., location of all skeletal joints in time) live on a non-linear manifold, it cannot be captured by linear models, such as principal component analysis (PCA). Therefore, an unsupervised method that uses a pseudo-invertible nonlinear dimensionality reduction with Auto-Encoder is used, while inducing the embedding space to match a uniform distribution. In the present invention, the Auto-Encoder is applied to the action recognition application. Consider a raw video stream S such that $s_i \in A$, where i ranges from 1 to N and the $i^{th}$ segment consist of only one action $a_j$ such that $a_j \in B$, where j is the action index and ranges from 1 to M. For each video segment $s_i$, first localize the skeletal joint map within each frame, similar to Literature Reference No. 12. For each person within each video segment, a new feature vector $x_i$ is defined based on the informative joint positions. In order to find the most discriminative pattern between actions, the feature $x_i$ is mapped to a lower dimensional embedded space. This is done with autoencoder architectures. The autoencoder is a neural network architecture and the simplest case consists of three layers: an encoder layer, a hidden layer, and a decoder layer. The encoder layer maps the input to a hidden representation h such that $h=f((w*x_i+b))$, where w is a weight matrix between input layer and hidden layers, $x_i$ is the input data, b is the bias, and f is the non-linear activation function (e.g., sigmoid function such as $f(x)=(1+e^{-x})^{-1}$)). The loss function of the autoencoder is designed similar to Literature Reference No. 13, where there is control on the distribution of embedded space during the dimensionality reduction. During the training process, the embedded information is used to regenerate the same information as the input $x_i$. Therefore, $x'_i=g((w'*h+d))$, where w' is the weight matrix between output layer and the hidden layer, $x'_i$ is the output data, d is the bias, and g is a non-linear activation function. Doing so, the network weights are optimized such that once the training is done, the reconstruction error goes to zero which means that a good embedding process that can preserve the patterns in the data has been achieved. In the setup, the dimension of the embedding space was two and, therefore, for every single point in the 2D embedded space there is an atomic representation of several poses that are mapped into the same rich pattern. In other words, with the use of autoencoders, the actions are first encoded in a much lower dimensional embedding space, and the system trains to regenerate the same actions from the embedded space. Doing so one can create a "rich" embedding space that is a good representative of actions. Furthermore, the discriminative patterns between actions can be preserved in a much lower dimension. During the test time, the temporal pose of each detected person is represented as a trajectory in the 2D embedded space where each point on the trajectory corresponds to a particular pose information.

The approach described herein enables action classification to be trained with minimal samples, which is particularly useful for data driven models. As a result, simple supervised learners can be formulated, which require much smaller labeled dataset for training (e.g., <10 samples). Applying the technique according to embodiments of the present disclosure on standard datasets, an average accuracy of 91% is demonstrated, with only 10% of samples per class.

Unlabeled data can be mined cheaply and autonomously (e.g., from the internet or surveillance cameras). The framework according to embodiments of the present disclosure learns continuously without the supervision of the hidden structure in these data. With this framework, one can quickly enable machines to learn in the field (e.g., identifying a new set of actions with only a few training labels). Machine adaptation in the field is limited by the time to collect labeled data. Adapting with only a handful of labels will provide a strategic advantage.

Figure 10:
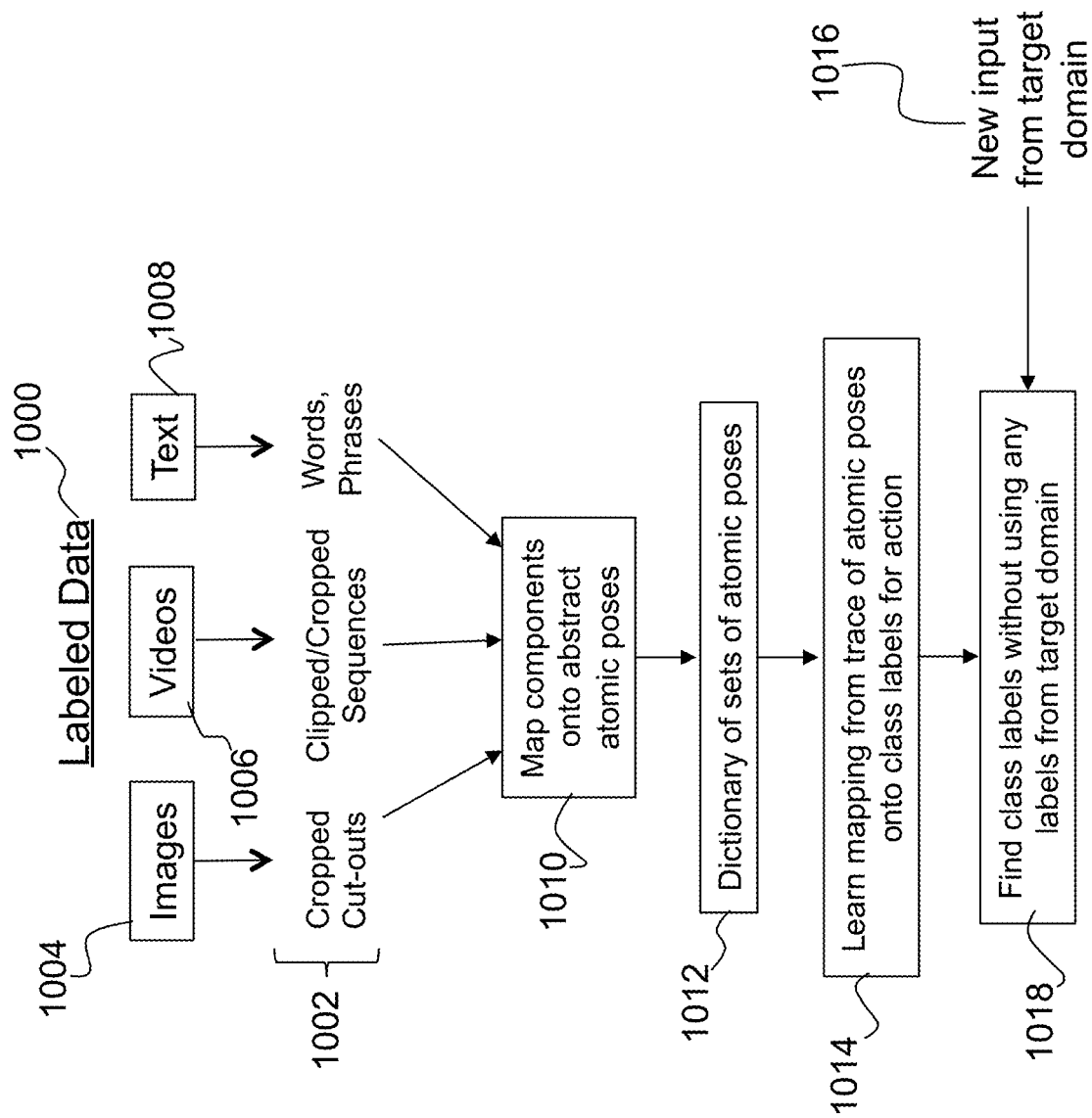
FIG. 10 is a diagram illustrating learning with limited training samples according to some embodiments of the present disclosure.

The challenge of learning with limited training samples is in data usage if the new input is sufficiently complex. For instance, when presented with a video of many actions, the chance of finding anything remotely close in any of the action databases is near zero. To overcome this problem, as depicted in FIG. 10, the system described herein separates the labeled data (element 1000) from all given source models (number of source models depends on the number of available action labels) into sufficiently small components (element 1002) (see Literature Reference No. 12). More generally, for images (element 1004), components could be cropped cutouts; for videos (element 1006), clipped and cropped sequences; and for text (element 1008), words or phrases. Then, the components are mapped onto abstract atomic poses (shown in FIG. 4) (i.e., without labels) (element 1010). Components are a representation of each sample. For example, for a given image of the body the pose information can be a component representation of that image. With this mapping, a dictionary of sets of atomic poses (element 1012) for each sample is implicitly created from the pre-trained models (which is obtained by using the entire available action video samples in training the autoencoder), and a separate mapping is learned from the trace of atomic poses onto class labels for action (element 1014). When presented with new input from the target domain (element 1016), this input is mapped onto a trace of atomic poses and find the corresponding class label, without using any label from the target domain (element 1018). Elements 1014 and 1018 represent training of the KNN classifier.

Figure 4:
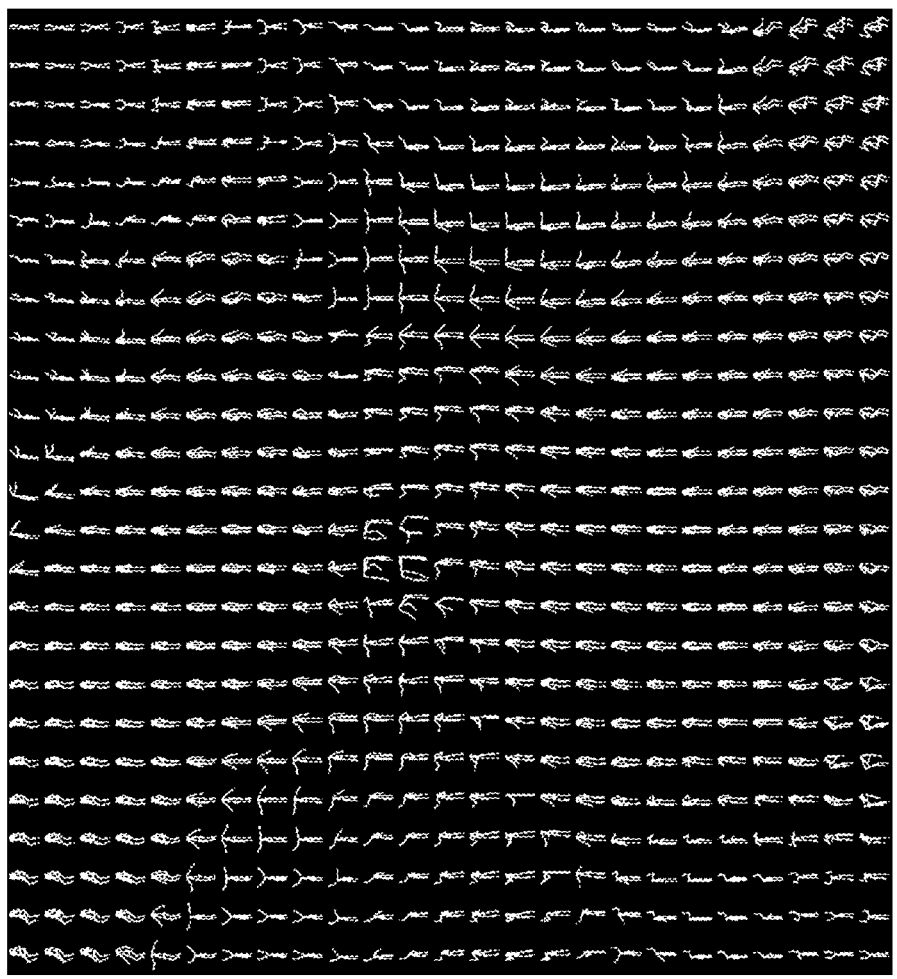
FIG. 4 is an illustration of atomic poses in the embedding space trained on the Berkeley multimodal human action database (MHAD) with zero training labels according to some embodiments of the present disclosure.

To this end, three technical challenges are addressed. First, unlabeled input data is mapped onto an embedding feature space in which atomic poses (the unique poses that are created in the embedding space as shown in FIG. 4) can be discriminated. To learn such embedding feature space, self-supervised learning (SSL) is used, which maps input data onto a latent feature space in an unsupervised way by using a pseudo-task (aka "proxy task" or "surrogate task"). The current state-of-the art is to manually design such a pseudo task (see Literature Reference No. 10). Pseudo-task optimization is a form of meta-learning and the innovation is to automatically optimize the pseudo-task such that SSL learns network parameters that extracts atomic poses that are comparable to the ones extracted with supervised learning on the source data. Each autoencoder network consists of encoding layers and decoding layers. Within each layer, there are parameters that are specifically optimized toward generation of atomic poses in the embedding space.

Second, a transductive learning technique is needed, where unknown labels are propagated from known labels in the latent space. It is very difficult to know the true distribution of action patterns in the embedding space, and this is due to lack of sufficient training data; therefore, standard distributions such as K-Nearest Neighbor (KNN), or Gaussian (radial basis function) are not ideal for the embedding space. Therefore, similar to Literature Reference No. 11, a Transductive K-Nearest Neighbor (tKNN) was formulated which applies transduction to KNN so that the labels can be propagated in a more accurate fashion.

Third, there is a need to map the target data onto the trace of atomic poses (e.g., the trajectory shown in element 318) from the source data without having labels. To solve this problem, a unique zero-shot attribute distillation method is used, which trains a shared latent feature space (embedded feature space) for the target and source models by forcing the latent space to be predictive of the attributes for the source data and, simultaneously, generative of the target data. By encoding the image into an embedded space (latent space), a rich representation of each actions can be created using a trace (trajectory) of atomic poses. Given this shared latent space, a new target data point can then be mapped onto a probability distribution of atomic poses. Finally, when presented with new data, its decomposition might not find any match in the dictionary based on the source models. To limit this problem, the aim is to construct sufficiently basic and diverse atomic poses using a uniform distribution, so that most of the target data can be covered.

Figure 3:
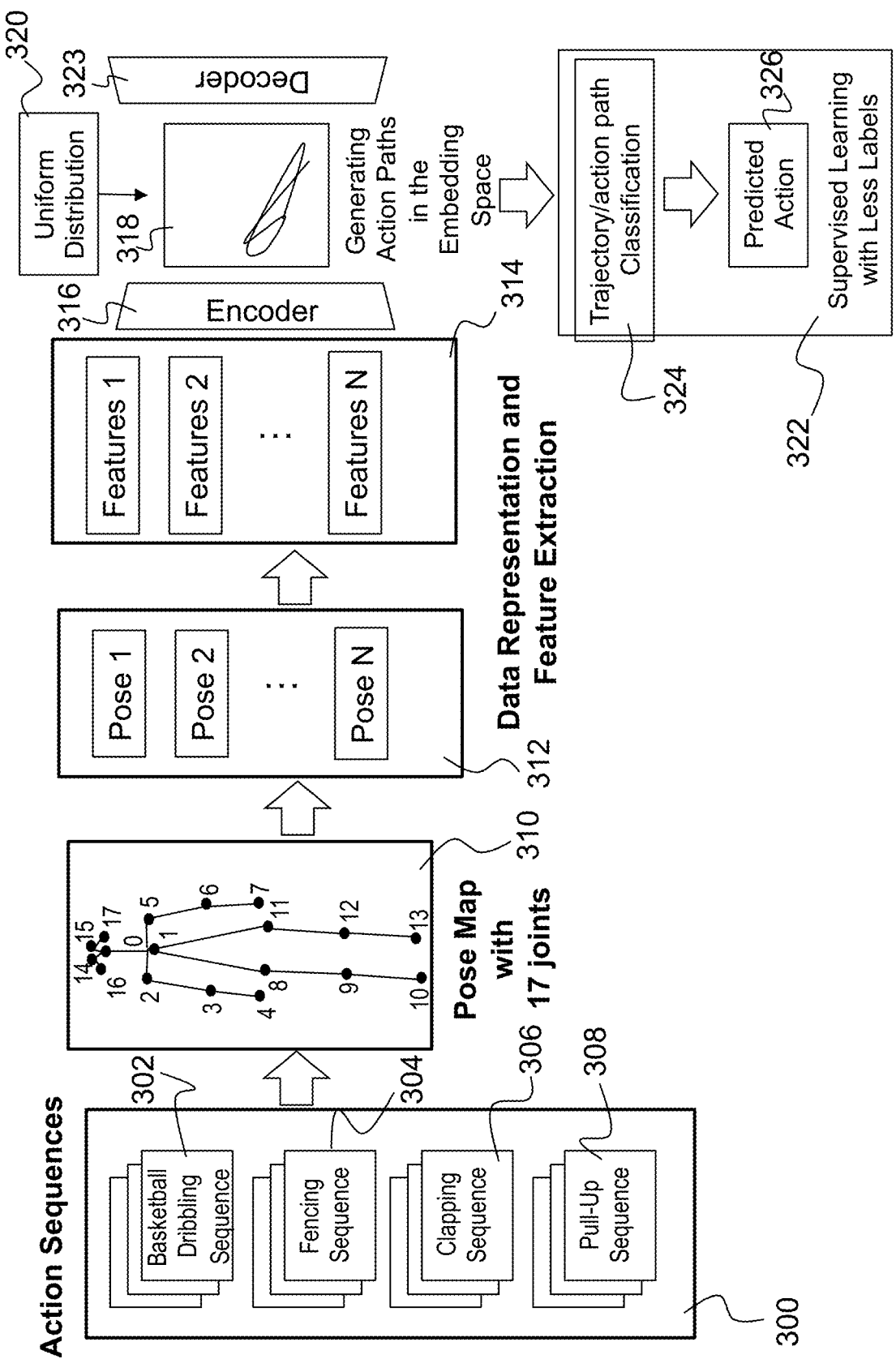
FIG. 3 is an illustration of accurate pose recognition according to some embodiments of the present disclosure.

FIG. 3 shows the overall diagram of the approach in which a fast and accurate pose recognition occurs through the following steps. Given a set of action sequences (element 300) in the form of a sequence of images (i.e., video), such as a basketball dribbling sequence (element 302), a fencing sequence (element 304), a clapping sequence (element 306), and a pull-up sequence (element 308), redundancies are eliminated (using, for example, Part Affinity Fields (described in Literature Reference No. 12)). This is done by using prior knowledge regarding what joint angles are expected to be connected. For example, wrist and elbow should be connected when elbow and knee should not. Then, a skeletal pose map (element 310) with different trajectories is computed. A feature representation of poses (element 312), resulting in action pose features (element 314), is constructed based on informative joint angles from the skeletal pose map (element 310). The action pose features (element 314) are encoded (via an encoder (element 316)) to an embedding space (element 318) with enforced uniform distribution (element 320). This uniform distribution is enforced as a mapping criteria in the embedding space. The enforcement of the mapping criteria takes advantage of the entire embedding space which allows for a wider range of atomic poses. The invention described herein includes a technique to learn new models with only a few labels per class and minimal performance degradation relative to supervised learning techniques (i.e., supervised learning with less labels (element 322)). A decoder (element 323) is used to train the embedding space (element 318) such that the decoded images are correct. The training gives the embedding space (element 318) which, as a result, can be used to create trajectories to represent actions. Once the model is trained, there is no use for the decoder (element 323).

With the uniform distribution (element 320) of atomic poses, classified trajectories (element 324) are used to generate a predicted action (element 326). In one embodiment, a linear classifier tKNN is used to classify the trajectories (element 324); however, as can be appreciated by one skilled in the art, other classifiers can be used. The mapping technique according to embodiments of the present disclosure is unique and involves mapping the action pose features (element 314) to the embedding space (element 318) where the redundant information is minimized and yet discriminative information (between action patterns) is intensified. The trajectory shown in element 318 is generated from many atomic poses. The form of dimensionality reduction where nonlinear action patterns are mapped to a linear space and simple linear classifiers can be applied is unique. As a result of the dimensionality reduction, performance is gained compared to the prior art, and the model can be trained with much fewer samples.

FIG. 4 shows an example of atomic poses in the embedding space. Only the poses in a particular location in this 2-dimensional space are visualized (each pixel is a unique atomic pose, and FIG. 4 shows only some of those poses in the embedding space). Since the uniform distribution in the embedding space is enforced, any point in this space would have a meaningful pose associated with it. The goal is to diversify these poses such that they are both unique and also representative of human action dynamics.

(3.1) Experimental Studies

To present the benefits of the method according to embodiments of the present disclosure, a comparison was made between the approach described herein using a smaller number of labels in the embedding space and full feature-based methods. For this evaluation, the Berkeley multimodal human action database (MHAD) dataset and the Human Motion Database (HMDB-51) dataset were utilized. In those two datasets, all eleven actions from the MHAD dataset and only ten selected actions from the HMDB dataset were used. This selection was due to the unbalanced nature of the dataset. FIGS. 5A and 5B depict a select set of action types from the HMDB dataset, sample frames, and the trajectories of the corresponding action in the embedding space. Note that each action in the embedding space has a unique action path pattern (i.e., trajectory).

Figure 6A:
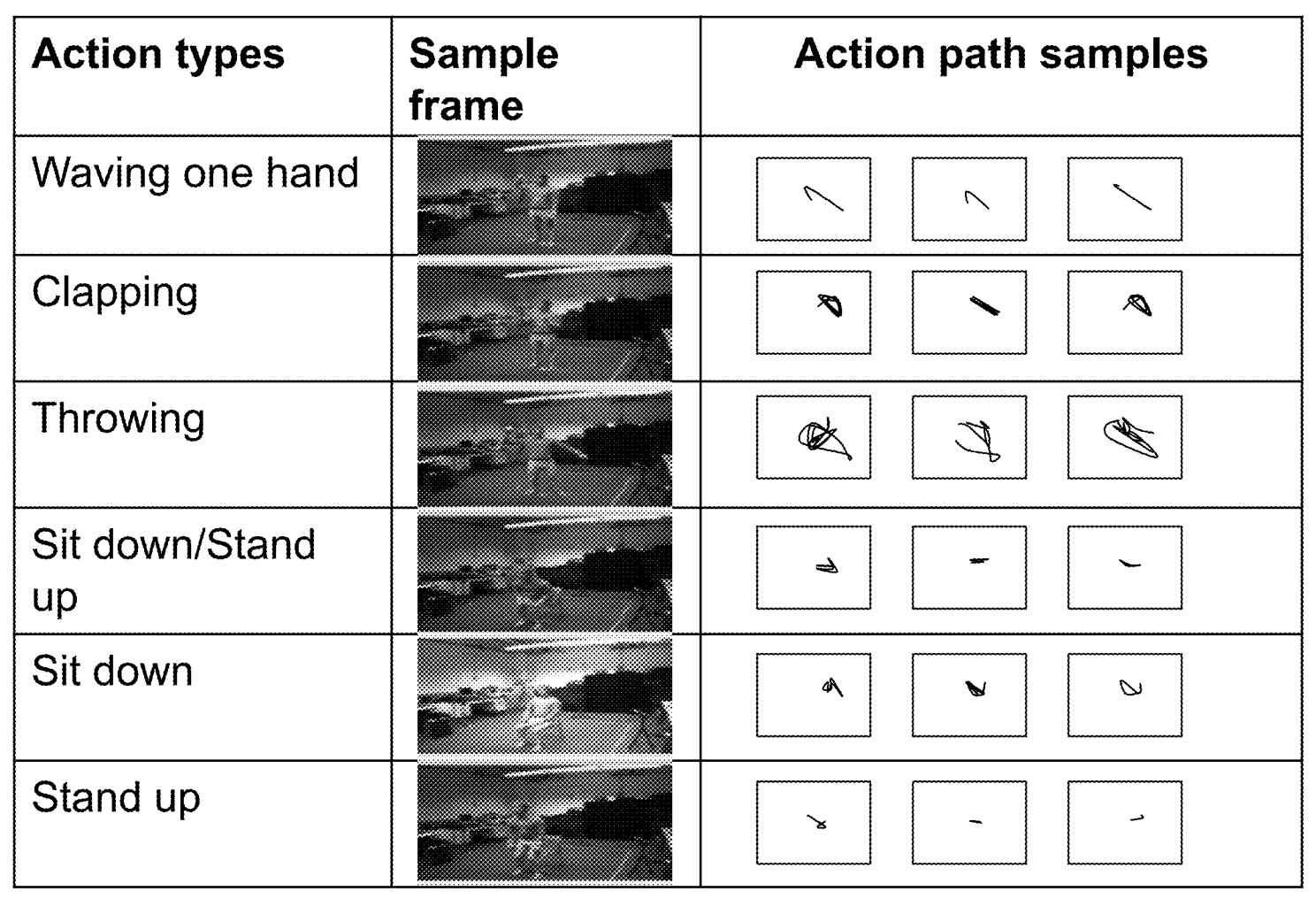

FIGS. 6A and 6B depict Berkeley MHAD action types with sample frames and the corresponding sample action path images in the embedding space. As shown in the figures, action patterns can differentiate one action from others through classifying paths in the embedding space. Here, more samples are shown from the embedding space to make a point on the consistency of each pattern.

FIG. 7A illustrates the distribution of the number of samples in the training set for all selected actions in the HMDB-51 dataset. FIG. 7B illustrates the distribution of the number of samples in the training set for all selected actions in the in the MHAD dataset.

Figure 8:
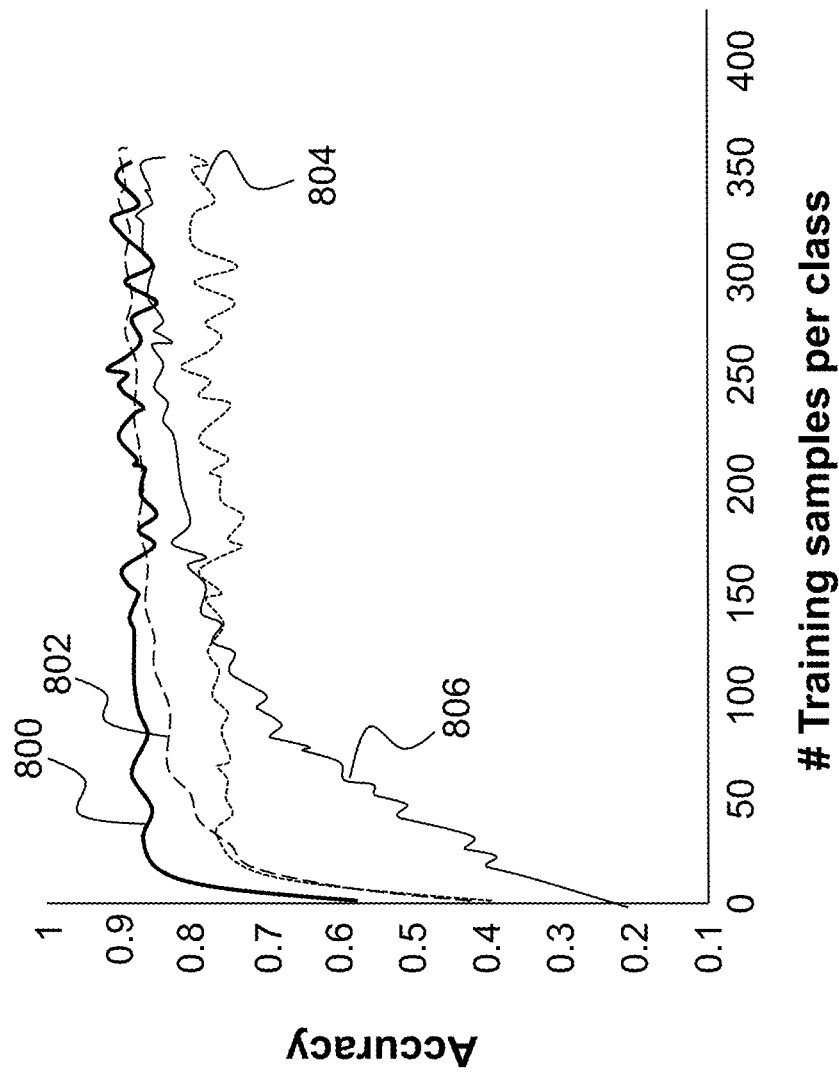
FIG. 8 is a graph illustrating an accuracy measure as a function of a number of training samples per class for the MHAD dataset according to some embodiments of the present disclosure.

FIG. 8 is a graph presenting performance (classification accuracy) comparison on the Berkeley MHAD dataset. The accuracy measure is a function of a number of training samples per class for the MHAD dataset. Curve 800 represents classification accuracy with running a KNN classifier with a smaller number of labels in the embedding space, curve 802 represents classification accuracy with running a LSTM classifier with full features, curve 804 represents classification accuracy with running a KNN classifier with full features, and curve 806 represents classification accuracy with running a LSTM classifier with a smaller number of labels in the embedding space. Note that the method according to embodiments of the present disclosure reaches approximately 90% accuracy with the relatively smaller number of training samples per class, as indicated by curve 800 (i.e., embedded KNN classifier). Running a KNN with the embedding space projection (curve 800) provides the best performance even with a smaller number of samples.

Figure 9:
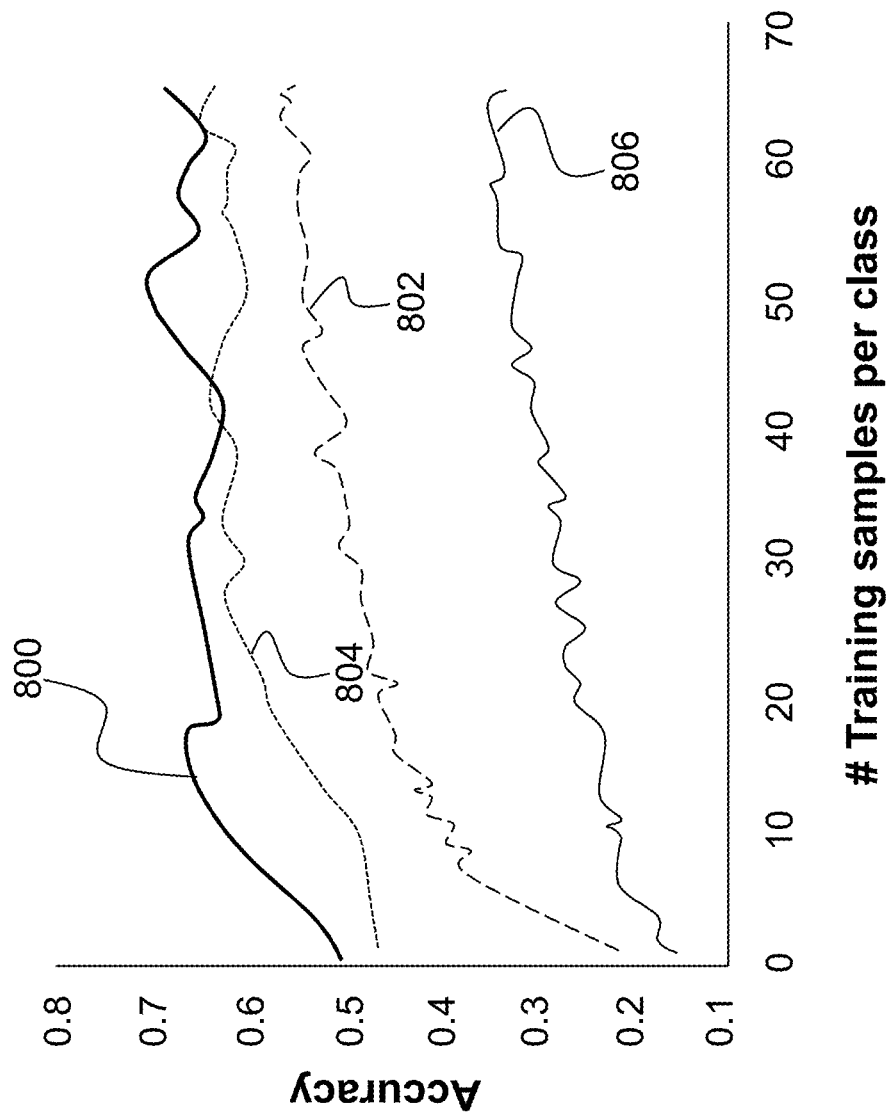
FIG. 9 is a graph illustrating an accuracy measure as a function of a number of training samples per class for selected classes in the HMDB dataset according to some embodiments of the present disclosure.

FIG. 9 is a graph showing a performance (classification accuracy) comparison on the selective HMDB dataset. The accuracy measure is a function of a number of training samples per class for selected classes in the HMDB dataset. As with FIG. 8, curve 800 represents classification accuracy with running KNN classifier with a smaller number of labels in the embedding space, curve 802 represents classification accuracy with running LSTM classifier with full features, curve 804 represents classification accuracy with running KNN classifier with full features, and curve 806 represents classification accuracy with running LSTM classifier with a smaller number of labels in the embedding space. Similar to the comparison test with the MHAD dataset, in the HMDB dataset comparison test, running KNN with the embedding space projection (curve 800) provides the best performance even with a smaller number of samples. With ten labels or less, the system described herein can achieve the same accuracy as supervised methods.

The invention described herein supports computer vision and machine learning. For instance, in the field of vehicle manufacturing, lack of labeled data is a big bottleneck for data-driven approaches. With the action learning technique described herein, which uses only a few labels, classification is performed much quicker and more accurately. Furthermore, robust human gesture recognition can facilitate autonomous cars with human instructions (e.g., construction worker, traffic officer). Based on the classification of the action pattern associated with the human gesture, the system described herein causes a vehicle/driving maneuver to be performed by the autonomous vehicle that corresponds to the class label identified by the system. For example, if the gesture is a construction worker or traffic officer holding up a hand to indicate "stop", the system can cause the autonomous vehicle to apply a functional response, such as a braking operation implemented by a braking mechanism within the vehicle, in order to bring the autonomous vehicle to a stop. Likewise, if the system recognizes a pedestrian running or walking in front of the vehicle, the system can cause the vehicle to stop to avoid hitting the pedestrian. Other appropriate vehicle maneuver responses may include one or more of a steering operation, a throttle operation to increase speed or to decrease speed, or a decision to maintain course and speed without change. The vehicle responses may be appropriate for avoiding a collision or altering travel speed. In one embodiment, if the system detects a moving object in its path (e.g., a pedestrian, another vehicle), an alert is sent to the vehicle operating system to cause the vehicle to perform a braking operation. Alternatively, the alert may signal that the vehicle operating system should perform a swerving motion around the object, involving steering and accelerating operations or any other operations as required to provide for collision avoidance.

Figure 11:
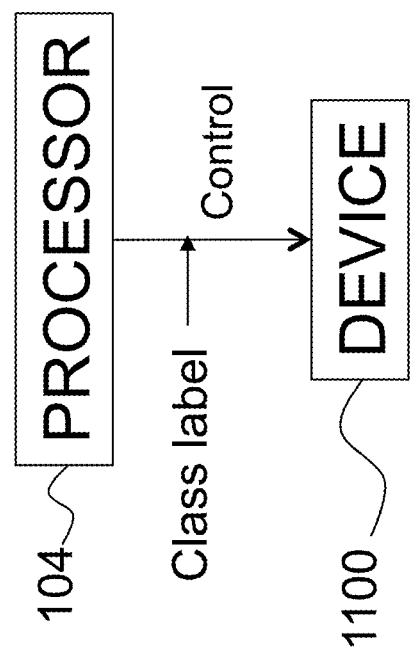
FIG. 11 is a diagram illustrating control of a device using class labels according to some embodiments of the present disclosure.

FIG. 11 is a flow diagram illustrating using a processor 104 to control a device 1100 using the class labels for the actions recognized by the system described herein. In one embodiment, the class label corresponds to a pedestrian's actions, and the vehicle is caused to maneuver around the pedestrian. Non-limiting examples of devices 1100 that can be controlled via the processor 104 and the class labels include a vehicle or a vehicle component, such as a brake, a steering mechanism, suspension, or safety device (e.g., airbags, seatbelt tensioners, etc.). As can be appreciated by one skilled in the art, control of other device types is also possible.

Additional non-limiting applications include threat detection, gesture-based control of machines (e.g., aircraft marshaling), combat situational awareness (e.g., recognizing soldier intentions), Active and Assisted Living (AAL), and Healthcare Monitoring Systems.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for learning actions for image-based action recognition in an autonomous vehicle, the system comprising:
    one or more processors and a non-transitory computer-readable medium having executable instructions encoded thereon such that when executed, the one or more processors perform an operation of:
        separating a set of labeled action image data from a source domain into components;
        mapping the components onto a set of action patterns, thereby creating a dictionary of action patterns;
        for each action in the set of labeled action data, learning a mapping from the action pattern representing the action onto a class label for the action;
        mapping a set of new unlabeled target action image data onto a shared embedding feature space in which action patterns can be discriminated;
        learning the shared embedding feature space using self-supervised learning, wherein self-supervised learning maps input data onto a latent feature space in an unsupervised way;
        for each target action in the set of new unlabeled target action image data, identifying a class label for the target action; and
        based on the identified class label, causing the autonomous vehicle to perform a vehicle maneuver corresponding to the identified class label.

2. The system as set forth in claim 1, wherein the one or more processors further perform an operation of mapping a data point from the set of new unlabeled target action image data onto a probability distribution of action patterns.

3. The system as set forth in claim 1, where in mapping the set of new unlabeled target action image data, the one or more processors further perform operations of:
    computing a skeletal pose map comprising a set of joint angles from the set of new unlabeled target action image data;
    generating a feature representation of poses based on the set of joint angles, resulting in a set of action pose features; and
    encoding the set of action pose features to the shared embedding feature space with a uniform distribution.

4. The system as set forth in claim 3, wherein the one or more processors further perform operations of:
    generating a target action pattern representing the target action in the shared embedding feature space from the encoded set of action pose features; and
    classifying the target action pattern.

5. The system as set forth in claim 1, wherein the target action pattern is classified by a transductive K-Nearest Neighbor classifier.

6. The system as set forth in claim 1, wherein the identified class label corresponds to a pedestrian's actions, and the vehicle maneuver is a maneuver around the pedestrian.

7. A computer implemented method for learning actions for image-based action recognition in an autonomous vehicle, the method comprising an act of:
    causing one or more processors to execute instructions encoded on a non-transitory computer-readable medium, such that upon execution, the one or more processors perform operations of:
        separating a set of labeled action image data from a source domain into components;
        mapping the components onto a set of action patterns, thereby creating a dictionary of action patterns;
        for each action in the set of labeled action data, learning a mapping from the action pattern representing the action onto a class label for the action;
        mapping a set of new unlabeled target action image data onto a shared embedding feature space in which action patterns can be discriminated;
        learning the shared embedding feature space using self-supervised learning, wherein self-supervised learning maps input data onto a latent feature space in an unsupervised way;
        for each target action in the set of new unlabeled target action image data, identifying a class label for the target action; and
        based on the identified class label, causing the autonomous vehicle to perform a vehicle maneuver corresponding to the identified class label.

8. The method as set forth in claim 7, wherein the one or more processors further perform an operation of mapping a data point from the set of new unlabeled target action image data onto a probability distribution of action patterns.

9. The method as set forth in claim 7, where in mapping the set of new unlabeled target action image data, the one or more processors further perform operations of:
    computing a skeletal pose map comprising a set of joint angles from the set of new unlabeled target action image data;
    generating a feature representation of poses based on the set of joint angles, resulting in a set of action pose features; and
    encoding the set of action pose features to the shared embedding feature space with a uniform distribution.

10. The method as set forth in claim 9, wherein the one or more processors further perform operations of:
    generating a target action pattern representing the target action in the shared embedding feature space from the encoded set of action pose features; and
    classifying the target action pattern.

11. The method as set forth in claim 7, wherein the target action pattern is classified by a transductive K-Nearest Neighbor classifier.

12. The method as set forth in claim 7, wherein the identified class label corresponds to a pedestrian's actions, and the vehicle maneuver is a maneuver around the pedestrian.

13. A computer program product for learning actions for image-based action recognition in an autonomous vehicle, the computer program product comprising:
    computer-readable instructions stored on a non-transitory computer-readable medium that are executable by a computer having one or more processors for causing the processor to perform operations of:
        separating a set of labeled action image data from a source domain into components;
        mapping the components onto a set of action patterns, thereby creating a dictionary of action patterns;
        for each action in the set of labeled action data, learning a mapping from the action pattern representing the action onto a class label for the action;
        mapping a set of new unlabeled target action image data onto a shared embedding feature space in which action patterns can be discriminated;
        learning the shared embedding feature space using self-supervised learning, wherein self-supervised learning maps input data onto a latent feature space in an unsupervised way;
        for each target action in the set of new unlabeled target action image data, identifying a class label for the target action; and
        based on the identified class label, causing the autonomous vehicle to perform a vehicle maneuver corresponding to the identified class label.

14. The computer program product as set forth in claim 13, further comprising instructions for causing the one or more processors to perform an operation of mapping a data point from the set of new unlabeled target action image data onto a probability distribution of action patterns.

15. The computer program product as set forth in claim 13, where in mapping the set of new unlabeled target action image data, the computer program product further comprises instructions for causing the one or more processors to further perform operations of:
    computing a skeletal pose map comprising a set of joint angles from the set of new unlabeled target action image data;
    generating a feature representation of poses based on the set of joint angles, resulting in a set of action pose features; and
    encoding the set of action pose features to the shared embedding feature space with a uniform distribution.

16. The computer program product as set forth in claim 15, further comprising instructions for causing the one or more processors to further perform operations of:
    generating a target action pattern representing the target action in the shared embedding feature space from the encoded set of action pose features; and
    classifying the target action pattern.

17. The computer program product as set forth in claim 13, wherein the target action pattern is classified by a transductive K-Nearest Neighbor classifier.

* * * * *